United States Patent [19]

Kanda

[11] 4,008,462
[45] Feb. 15, 1977

[54] PLURAL CONTROL MEMORY SYSTEM WITH MULTIPLE MICRO INSTRUCTION READOUT

[75] Inventor: Yasunori Kanda, Kawasaki, Japan
[73] Assignee: Fujitsu Ltd., Kawasaki, Japan
[22] Filed: Dec. 6, 1974
[21] Appl. No.: 530,301
[30] Foreign Application Priority Data
Dec. 7, 1973    Japan ................ 48-139211
[52] U.S. Cl. .................................... 340/172.5
[51] Int. Cl.² ............... G06F 7/28; G06F 13/00; G11C 7/00
[58] Field of Search .................. 340/172.5
[56] References Cited
UNITED STATES PATENTS

| | | | |
|---|---|---|---|
| 3,270,324 | 8/1966 | Meade et al. | 340/172.5 |
| 3,292,151 | 12/1966 | Barnes et al. | 340/172.5 |
| 3,354,430 | 11/1967 | Zeitler, Jr. et al. | 340/172.5 |
| 3,389,380 | 6/1968 | Ashbaugh et al. | 340/172.5 |
| 3,395,392 | 7/1968 | Kulikauskas et al. | 340/172.5 |
| 3,601,812 | 8/1971 | Weisbecker | 340/172.5 |
| 3,602,896 | 8/1971 | Zeheb | 340/172.5 |
| 3,609,700 | 9/1971 | Wollum et al. | 340/172.5 |
| 3,737,860 | 6/1973 | Sporer | 340/172.5 |
| 3,812,473 | 5/1974 | Tucker | 340/172.5 |
| 3,813,652 | 5/1974 | Elmer et al. | 340/172.5 |

*Primary Examiner*—Melvin B. Chapnick
*Attorney, Agent, or Firm*—Staas & Halsey

[57] ABSTRACT

A microprogramming control system employing a plurality of low read rate control memories, for storing micro instructions, individually addressed in turn at a rate greater than the read rate of each memory. Each addressed control memory reads out a plurality of micro instructions. A selection circuit receives the plurality of micro instructions, in time shared fashion, read out in turn from each addressed control memory, then selects and gates a single micro instruction to a storage device. One portion of the selected micro instruction is designated as an address for the next micro instruction to be read out from the same control memory, and is accordingly gated to an address storage device at the input of the corresponding control memory.

5 Claims, 17 Drawing Figures

DATA REGISTER

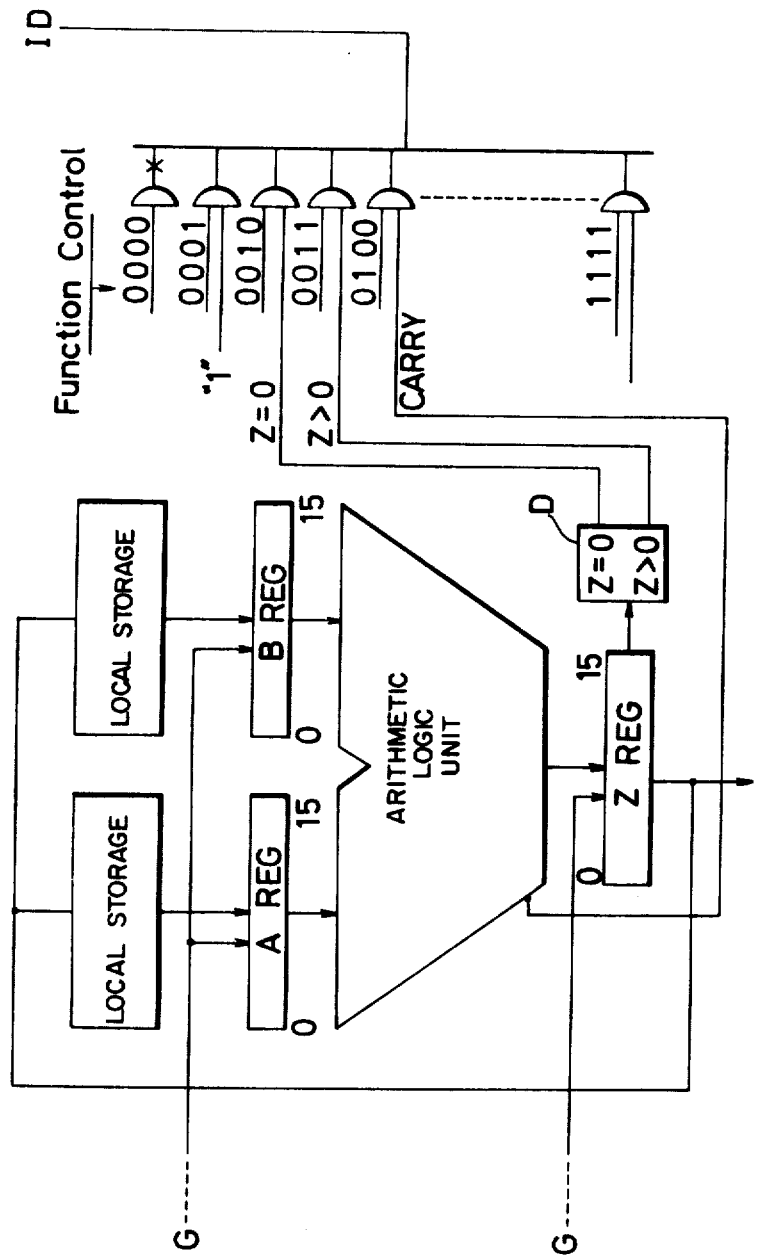

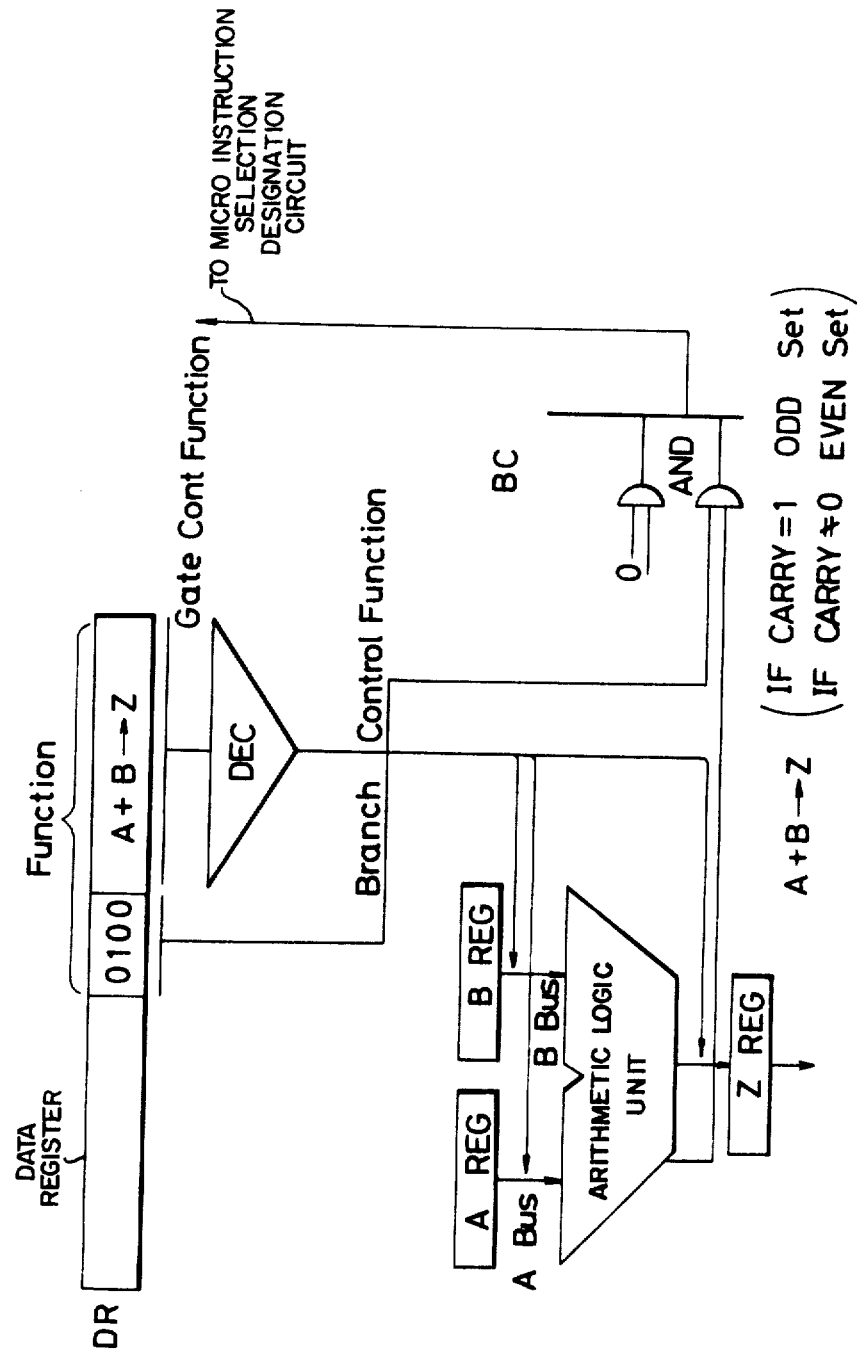

PLURAL CONTROL MEMORY SYSTEM WITH MULTIPLE MICRO INSTRUCTION READOUT

BACKGROUND OF THE INVENTION

1. Field of the Invention

This invention relates to a microprogramming control system, and more particularly to a microprogramming control system, in with which it is possible to read out micro instructions at the same speed as that for readout of micro instructions in the prior art, although using a control memory of lower read rate performance than a conventional one.

2. Description of the Prior Art

Readout, interpretation and execution of micro instructions can be realized by several tens of combinations of basic operations such as transfer between registers, starting of a main memory, an offset, the use of adder, etc. Recently, micro program processing, has been employed, in which instructions (micro instructions) designating the basic operations are gathered, stored in a control memory and sequentially read out in the unit of each micro instruction for execution. The group of gathered micro instructions is called a micro program; and the control system for this micro program is called a micro program control system.

With reference to FIGS. 1, 2 and 3, a conventional micro program control system will be described.

In FIG. 1, a leading address of a microprogram, corresponding to a micro instruction, is set in an address register AR. The leading address is decoded by a decoder DEC and applied to a control memory CM. A micro instruction corresponding to the leading address is then read out from control memory CM. The read-out micro instruction is stored in a data register DR. One part of the micro instruction stored in the data register DR is applied to the address register AR for designating the address of the next micro instruction and the remaining part of the micro instruction is used as a control system FN for controlling the operation of a computer.

In this case, since the processing speed of the computer is dependent upon the read rate of the micro instruction, it is desired to increase the micro instruction read rate as high as possible. Therefore, a memory capable of high-speed processing is generally employed, since the speed of a memory used as the control memory CM usually occupies the larger part of the micro instruction read time. However, such a memory capable of high-speed processing is expensive, and hence is a bottleneck in the production of inexpensive computers.

Further, with the system of FIG. 1, in the case of a conditional branch corresponding to a certain condition, a new address is determined according to the condition and the next micro instruction is read out in accordance with the new address. Accordingly, the micro instruction which is read out in accordance with the preceding micro instruction, at the instant when the new address is determined according to the condition, is invalidated and the next micro instruction according to the new address is used for branch. This imposes a substantial limitation on the high-speed processing. However, processing according to microprogramming is usually adapted to be achieved in a predetermined mode of execution. Therefore, even if branch exists in the processing, the next step is determined according to the branch so that an instruction following the branch can be read out regardless of the condition.

To avoid the above state, a system shown in FIG. 2 has been adopted in the prior art. FIG. 2 shows in block form this system and FIG. 3 is a time chart of its operation. The control system of FIG. 2 is adapted such that an address indicated by the address register AR is decoded by the decoder DEC and applied to the control memory CM, whereby two micro instructions can be read out. In accordance with the result of a branch operation instructed by the control signal portion of the preceding micro instruction, a gating signal is developed which causes selection of one of the two micro instructions thus read out and its application to the data register DR, thereby blocking the application of the other micro instruction. The system, of selecting one of the two micro instructions, by the control system of FIG. 2, makes it possible to eliminate the waste time of the FIG. 1 system since the branch operation is caused by the control signal portion of the preceding micro instruction and a micro instruction is present at the input to the branch.

FIG. 3 is a time chart, for explaining the operations of respective parts of the system depicted in FIG. 2. Reference characters $t_0, t_1, t_2, \ldots$ indicate time cycles by a basic clock of the computer. Upon setting of the next address in the address register AR in the time cycle $t_1$, designated micro instructions are read out from the parts EVEN and ODD of the control memory CM, respectively, and, according to the result of an operation by the preceding micro instruction, a flip-flop F/F is actuated and read-out data of either one of the parts EVEN or ODD is set in the data register DR at the beginning of the next time cycle $t_2$.

Thus, the system of FIG. 2 requires a high operating speed for reading out each micro instruction from each of the parts EVEN and ODD of the control memory CM within each time cycle of the basic clock, and necessitates the use of a control memory CM of excellent performance. To this end, it is necessary to employ an expensive memory.

SUMMARY OF THE INVENTION

An object of this invention is to provide a micro-programming control system which does not require a control memory of high-speed operation, but enables the same high-speed control as that obtainable in the past.

Briefly stated, the microprogramming control system according to this invention is a system which comprises a control memory for providing a plurality of micro instructions by application of a single address; a selection gate for selecting one of the plurality of micro instructions read out from the control memory; and a data register for storing a selected micro instruction derived from the selection gate; an address register to obtain an address contained in the micro instruction stored in the data register, which determines the next plurality of micro instructions from the control memory. The system also provides a plurality of control memories sequentially using the data register in a time sharing manner, so that by applying micro instructions sequentially to the data register from the plurality of control memories, the address of a future micro instruction to be read out is designated at least two steps ahead of time.

BRIEF DESCRIPTION OF THE DRAWINGS

FIG. 8 is a detailed showing a branch condition;

FIG. 9 is a diagram showing the operation of a unit controlled by the circuit of FIG. 4;

DESCRIPTION OF THE PREFERRED EMBODIMENTS

Figure 4:
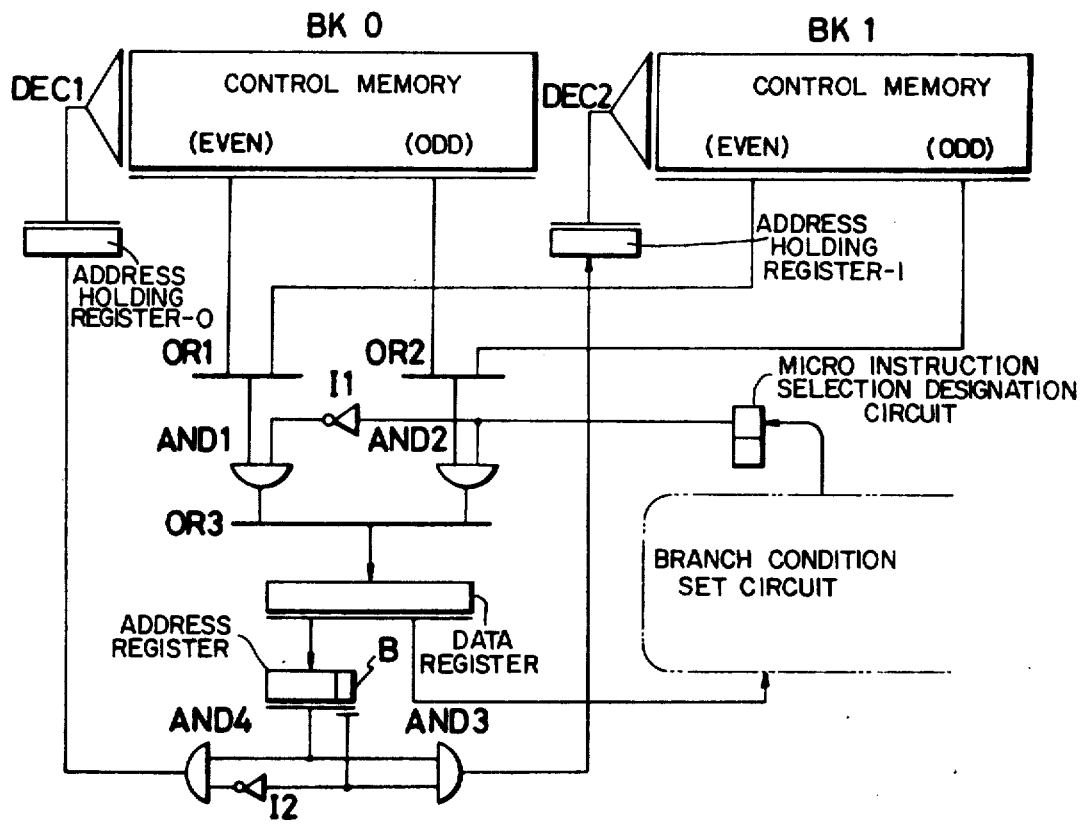
FIG. 4 is a block diagram illustrating one example of the microprogramming control system according to this invention.

FIG. 4 illustrates in block form one example of the micro instruction readout system according to this invention, which employs two banks, each formed with a control memory.

In FIG. 4, reference character CM indicates a control memory; BK0 and BK1 designate banks; DEC1 and DEC2 represent decoders; AHR0 and AHR1 identify address holding registers; DR denotes a data register; AR shows an address register; ID refers to a micro instruction selection designating circuit; BC indicates a branch condition set circuit; OR1, OR2 and OR3 designate OR (logical sum) circuits; AND1, AND2, AND3 and AND4 denote AND (logical product) circuits; and $I_1$ and $I_2$ identify inverter circuits.

As depicted in FIG. 4, the control memory CM is composed of control memory banks BK0 and BK1, to which addresses 0, 1, 4, 5, 8, 9, 12, 13, ... $4n$ and $4n+1$ and addresses 2, 3, 6, 7, 10, 11, 14, 15, ... $4n+2$ and $4n+3$ are assigned respectively. The above addresses of each bank are paired starting with the smallest address. The smaller address (the part EVEN) of each pair is applied from the address register through each decoder DEC1 or DEC2 to each bank, from each of which a micro instruction is derived corresponding to the applied address. The larger address of each pair results in a a micro instruction corresponding to the address of the part ODD. The following description will be made on the assumption that each control memory bank, in FIG. 4, is such that the micro instruction obtained therefrom, without regard to the operation such as branch, is recorded in the area corresponding to the address of the part EVEN; and the micro instruction following branch is that which is recorded in the area corresponding to the address of the part ODD.

In FIG. 4, when a leading address of a microprogram corresponding to a micro instruction is applied to the address register AR, this address is held in the address holding register AHR0 or AHR1 in accordance with a predetermined bank designating area B in the leading address. The address is decoded by the corresponding decoder DEC1 or DEC2. Then, a set of two micro instructions are read out from the control memory in accordance with the above address. The micro instructions thus read out from the control memory CM are applied to one input terminal of each of the AND circuits AND1 and AND2 through the OR circuits OR1 and OR2, respectively. The output from the micro instruction selection designating circuit ID is applied to the other input terminals of the AND circuits AND1 and AND2. The micro instruction selection designating circuit ID designates the condition of whether branch, based on the result of an operation or the like according to the preceding micro instruction, is effected or not. With the impression of this output, either one of the aforesaid set of two micro instructions is applied to the data register DR. For example, the micro instruction selection designating circuit ID is a flip-flop circuit. When the circuit ID is in its reset state, no branch exists and the AND circuit AND1 is conducted to apply the information of the part EVEN of the bank to the data register DR through the OR circuit OR3. Alternatively when the circuit ID is in its set state, branch exists and the AND circuit AND2 is conducted to apply the information of the part ODD of the bank to the data register DR through the OR circuit OR3.

Thereafter, the next address part of the micro instruction thus stored in the data register DR is transferred to the address register AR and the control part is transferred to respective parts of the computer. Substantially at the same time as the address part is stored in the address register AR, it is stored in the address holding register AHR0 or AHR01. in accordance with the control of information of the bank designating area B provided in the address part. Namely, the address part is stored in the address holding circuit AHR0 or AHR1 through the AND circuit AND4 or AND3 depending upon whether the bank designating area B is "0" or "1". Thereafter, the above operations are repeated.

Figure 1:
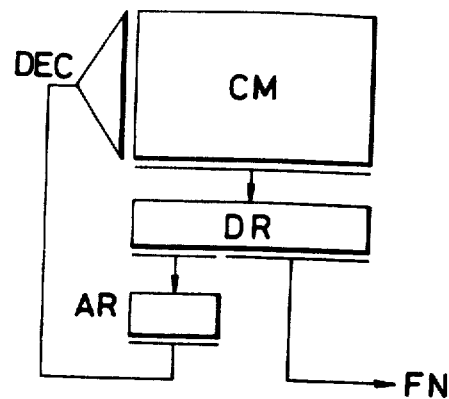
FIG. 1 is a block diagram showing one example of conventional prior art microprogramming control system.
Figure 2:
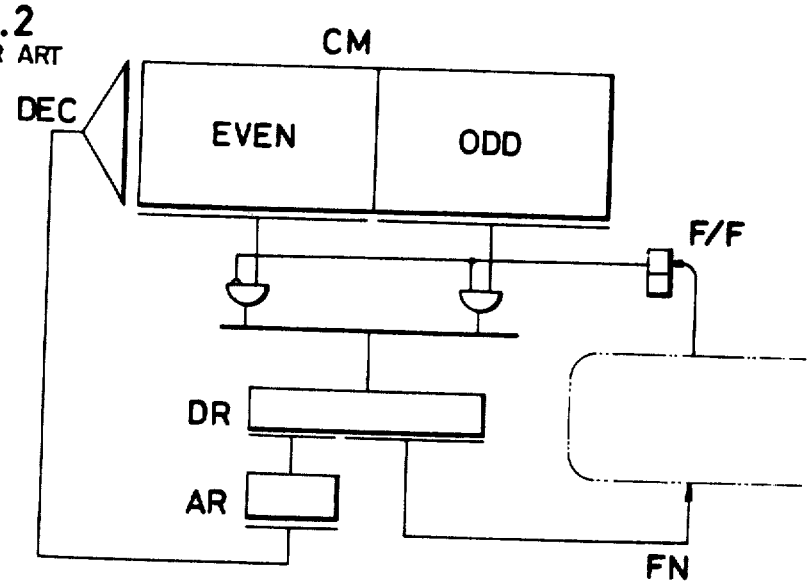
FIG. 2 is a block diagram showing another example of the conventional prior art microprogramming control system.
Figure 3:
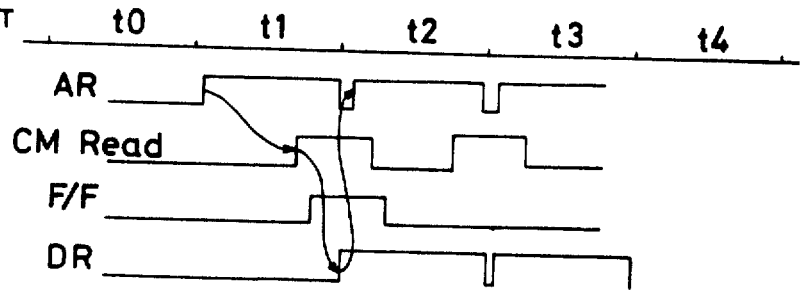
FIG. 3 is a time chart for reading-out of a micro instruction in the prior art example of FIG. 2.

Next, a description will be made of the reason why the performance of the microprogramming control system of this invention is equal to or more excellent than that of the conventional microprogramming control system of FIG. 2, in spite of using a control memory of poor performance. Let it be assumed that the control memory CM in FIG. 4 is formed with banks BK0 and BK1 whose individual capacity is half that of the expensive control memory in FIG. 2 and whose individual cycle time is twice as long as that of the expensive control memory in FIG. 2.

Figure 5:
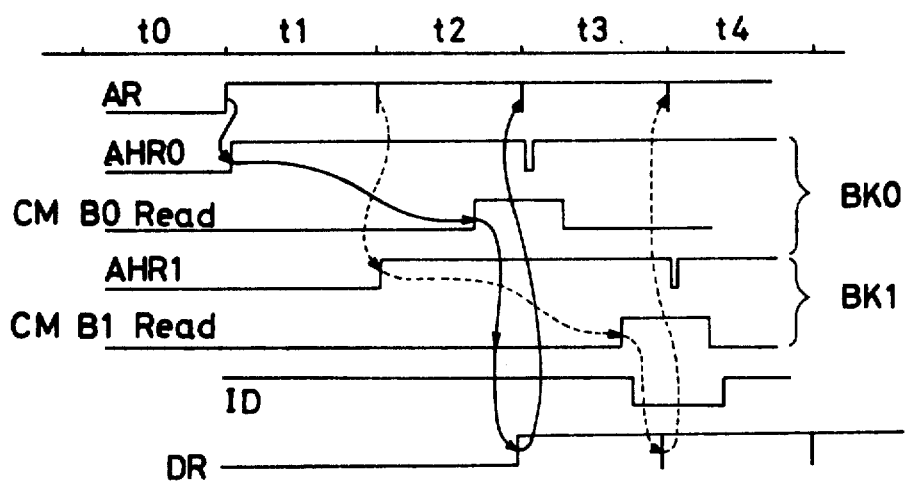
FIG. 5 is a time chart for reading-out a micro instruction in the example of FIG. 4.

FIG. 5 is a time chart for reading out the micro instruction in FIG. 4. Reference characters $t_0, t_1, t_2, \ldots$ indicate time cycles of the computer. For each cycle, one address is set in the address register AR.

Depending upon the bank designating area B in the address register AR, the address is applied either to bank BK0 or BK1, of the control memory CM. But since the memory readout cycle time of each of the banks BK0 and BK1 is required to be approximately equal to two cycles of the computer clock as described above, the address is temporarily stored in the address holding registers AHR0 and AHR1 for the remainder of the two cycles.

As illustrated in FIG. 5, the address from the address register AR is set in the address holding register AHR0 in the cycles $t_1, t_3, t_5, \ldots$ and set in the address holding register AHR1 in the cycles $t_2, t_4, t_6, \ldots$. The address, set in the address holding register AHR0, is decoded by the decoder DEC1 and ports EVEN and ODD are designated. Subsequently, in about two cycles, data are read out from the addresses of the memory of the bank BK0 (refer to CMB0 Read in FIG. 5). The data of the part EVEN is set in the data register DR, since the flip-flop of the micro instruction selection designating circuit ID is in its reset state. The next address part in the data register DR is then set in the address register AR with the cycle $t_3$.

The process, in which an address is first sent out from the address register AR and then the next address is set in the address register AR again, requires two cycles as indicated by the solid line arrows shown in FIG. 5. Likewise, an address, which is applied from the address register AR to the address holding register AHR1 to be set therein in the cycle $t_2$, is similarly used for reading out the data from the parts EVEN and ODD of the memory of the bank BK1 in two cycles. In this case, since the flip-flop of the micro instruction selection designating circuit ID is in its reset state, only the data of the part EVEN is set in the data register DR. The next address part of the data is set in the address register AR in the cycle $t_4$.

The readout operation of the bank BK1 also requires two cycles, and is indicated by chain line arrows in FIG. 5.

The readout operations of the banks BK0 and BK1 of the control memory CM are achieved alternately and overlap in time with respect to each other. Therefore, although the read rate of each bank is two cycles, the effective read rate is one cycle.

Figure 6:
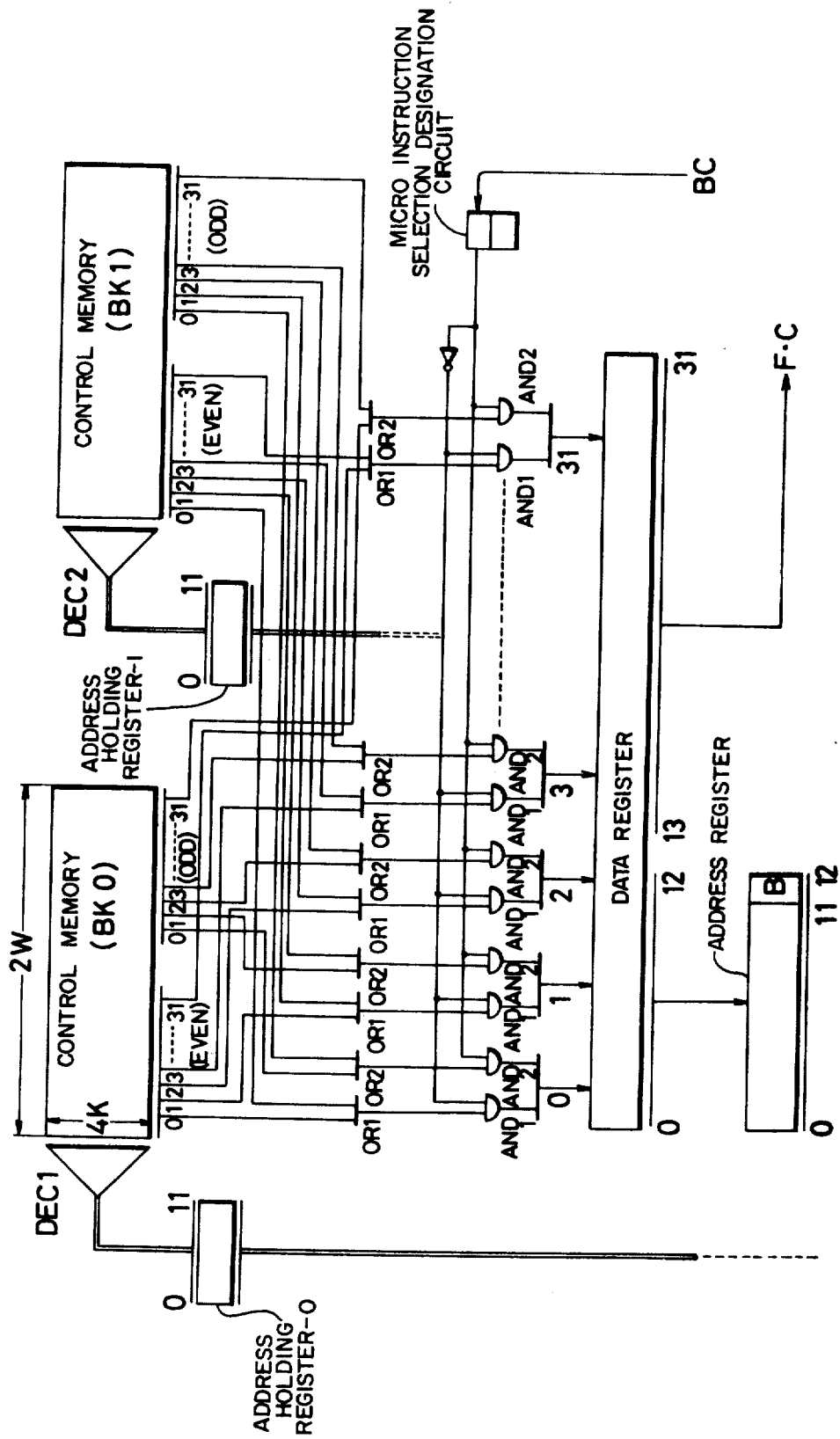
FIG. 6 is a detailed connection diagram of a portion of the system depicted in FIG. 4.

FIG. 6 is a detailed connection diagram of the circuit for reading out the data from the control memory of FIG. 4.

In the present example, bits 0 to 12 in the data register DR form the next address part. When this address part is set in the address register AR, the address of the bits 0 to 11 is applied to the address holding register AHR0 or AHR1, based on the value of the bank designating area B of the twelfth bit.

The number of the addresses which can be designated by the twelve bits 0 to 11 is $2^{12}=2048$. On the other hand, the banks BK0 and BK1 of the control memory CM each have two parts EVEN and ODD in which 4K words W of a 32-bit width can be stored, thereby increasing the number of addresses which can be designated to 4096. In all, 16KW can be stored in the control memory since the banks BK0 and BK1 each have two parts EVEN and ODD capable of storing 4KW. However, by designating the addresses of the bit 0 to 11 in common to the parts EVEN and ODD of the bank BK0 or BK1, only half the 16KW can be designated.

The addresses which can be designated by the bits 0 to 12 of the data register, that is, the thirteen bits, are 8KW. However, the twelfth bit (the bank designating area B) is used for switching the banks BK0 and BK1. The parts EVEN and ODD are switched by the micro instruction selection designating circuit ID. Therefore, if the bits 0 to 11 are used as addressing information, only one of the data read out from the parts EVEN and ODD of each bank is finally designated.

Thirty-two pairs of OR gates OR1 and OR2 for data readout are arranged and the OR gate OR1 of the first pair is supplied with the zeroth bit of the parts EVEN of each bank and the OR gate OR2 of the first pair is supplied with the zeroth bit of the part ODD of each bank. Similarly, the OR gates OR1 and OR2 of the second pair are supplied with the first bits of the parts EVEN and ODD of each bank and the remaining bits are sequentially applied to the OR gates OR1 and OR2 of the subsequent pairs.

The bank designating area B in the address register AR causes the bits 0 to 31 of the parts EVEN and ODD of either one of the banks (for example, BK0) to be applied to thirty-two pairs of AND gates AND1 and AND2, through the OR gates OR1 and OR2. The other inputs of the thirty-two pairs of AND gates AND1 and AND2 are connected to the flip-flop of the micro instruction selection designating circuit ID. When the flip-flop is in its reset state, no branch exists and only the AND gate AND1 is opened to pass therethrough the data of the part EVEN, and when the flip-flop is in its set state, branch exists and only the AND gate AND2 is opened to pass therethrough the data of the part ODD. Accordingly, the readout data of one word is set in the data register DR through the thirty-two OR gates. Further, the bits 0 to 12 of the next address part are applied to the address register AR and bits 13 to 31 of the function part are applied to a decoder for controlling an operation or the like.

Figure 7:
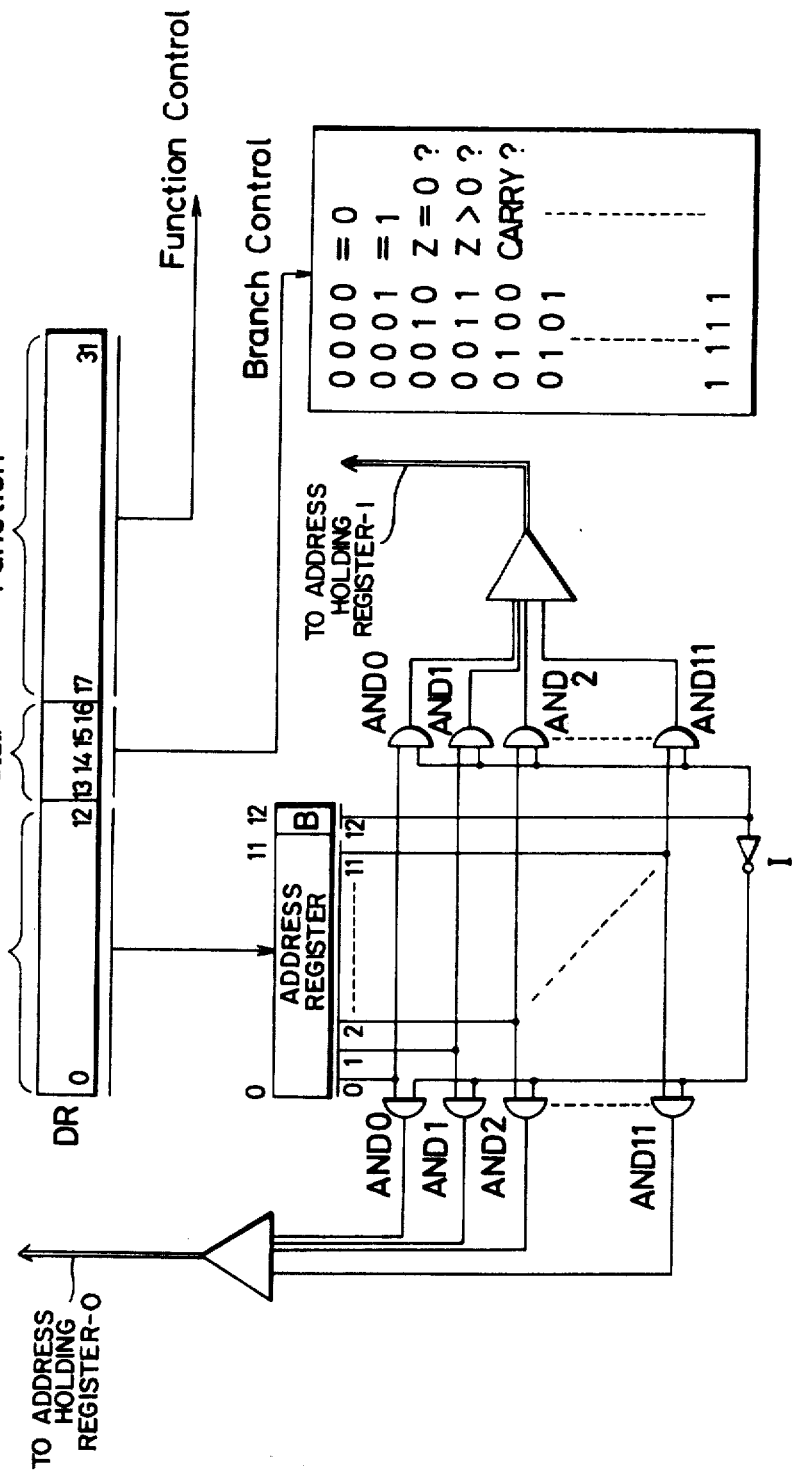
FIG. 7 is a connection diagram showing a circuit for switching the banks BK0 and BK1 and a diagram for explaining the branch control in the example of FIG. 4.

FIG. 7 shows a connection diagram of a circuit for switching the banks BK0 and BK1 and a diagram explaining the branch control.

When the bits 0 to 12 of the data register DR are set as the next address in the address register as described above, the upper bits 0 to 11 are each applied to one input of each of the AND gates AND0 to AND11 and only the twelfth bit is connected to the other inputs of the AND gates AND0 to AND11 directly or through an inverter I.

Accordingly, where the twelfth bit (the bank designating area B) is 0, the AND gates AND0 to AND11 on the side of the bank BK0 are opened, so that the bits 0 to 11 are applied to the address holding register AHR0. On the other hand, where the twelfth bit is 1, the AND gates AND0 to AND11 on the side of the bank BK1 are opened, so that the address of the bits 0 to 11 is applied to the address holding register AHR1.

The bits 13 to 16 of the data register DR form a branch control function part, which establishes the condition for branch by the combination of these bits.

As exemplified at the right-hand side of FIG. 7, in the case of the bits of the branch control function part being 0000, 0 is applied to the micro instruction selection designating circuit ID; in the case of 0001, 1 is provided; in the case of 0010, a signal is produced only when the value of a register Z (refer to FIG. 8) is 0 as a result of an operation; in the case of 0011, 1 is provided only when the value of the register Z is positive as a result of the operation; and in the case of 0100, 1 is provided only when carry exists as a result of the operation. In this manner, the condition for branch is established.

FIG. 8 is a detailed diagram explanatory of the branch condition.

The blocks are controlled circuits of the computer. Reference character LS indicates local storages; A REG and B REG designate registers for setting numbers to be operated on; ALU denotes an arithmetic and logical unit; Z REG identifies a register for setting the result of an operation; D represents a decision circuit; and G shows a gate signal from the decoder.

The bits 17 to 31 of the data register DR in FIG. 7 are applied to the decoder to provide a gate control signal G of the register, which is applied to address registers of the local storages LS, the registers A REG and B REG or the register Z REG.

By the application of the gate control signal, the data in the local storages LS are selected and set in the registers A REG and B REG and the result of the operation achieved in the arithmetic and logical unit ALU is set in the register Z REG. For example, the result of an operation for addition, logical sum, logical product or the like is applied from the register Z REG to other control circuits and utilized therein or it is stored again in the local storages LS.

The bits 13 to 16 of the data register DR in FIG. 7 constitute an area for establishing the condition for branch. As in the foregoing example, where this area is 0000, the next branch designation, that is, 0 is applied to the micro instruction selection designating circuit ID regardless of the result of operation and, also in the case of 0001, 1 is sent out as the next branch condition. In the cases of 0010, 0011, 0100, ··· the branch condition follows the result of operation. Namely, when the content of the register Z REG is decided, the decision circuit D is connected to the register Z REG to decide Z=0, Z>0, etc. and when the content of the register Z REG is in agreement with the above condition, a signal 1 is sent out. Further, in the case of following the presence or absence of carry, a carry signal is taken out from the upper digit of the arithmetic and logical unit and applied to an AND gate to apply the signal 1 to the micro instruction selection designating circuit ID.

FIG. 9 is a diagram, for explaining the outline of microprogramming.

For example, if the branch control bits of the data register DR.are 0100 and the content of the gate control function is a designation A+B → Z, the gate control function bit is decoded by a decoder DEC to apply a gate signal to selected registers A REG and B REG to be set in buses A and B. The result of addition of the contents of the buses A and B is derived from an output bus and set in the register Z REG. In a branch condition establishing circuit BC, a signal from the branch control function part of the data register DR is connected to one input of one of the AND gates AND a carry output signal from the arithmetic and logical unit ALU, is connected to the other input of the AND gate AND. Accordingly, where carry exists as a result of the operation A+B, the AND gate AND is opened to apply a branch instruction set signal to the micro instruction selection designating circuit ID to put the flip-flop in its set state. The part ODD of the memory control CM is thereby selected, at the time of reading-out of the next micro instruction. In the case of no carry output, the ANd gate AND is not opened and no set signal is sent out. Therefore, the flip-flop of the micro instruction selection designating circuit ID is put in its reset state and the part EVEN of the control memory CM is selected.

Since the decision of the branch condition is achieved in the former half of the cycle time, it is necessary to hold the state of decision until the latter half of the cycle time in which the micro instruction is read out. This can be achieved by putting the flip-flop of the micro instruction selection designating circuit ID in its set or reset state.

FIG. 10 is a diagram explanatory of the micro instruction readout operation. FIGS. 10A and 10B each show the sequence of operations of the micro instructions, for comparing a conventional system with this invention system. FIGS. 10C and 10D each show a method of the next address designation, for comparing the conventional system with this invention system.

Figure 10A:
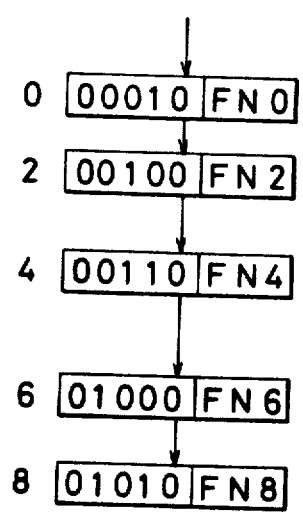
FIGS. 10A, 10B, 10C and 10D are diagrams showing the micro instruction reading-out states in the example of FIG. 4.
Figure 10B:
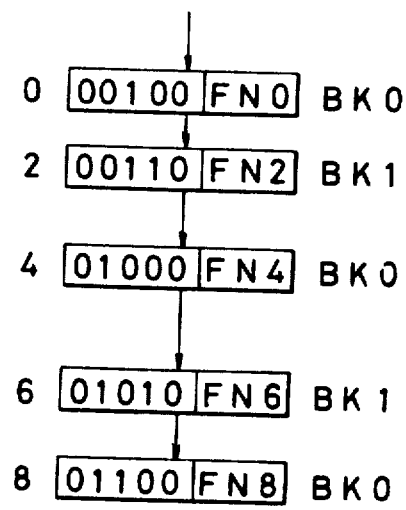
Figure 10C:
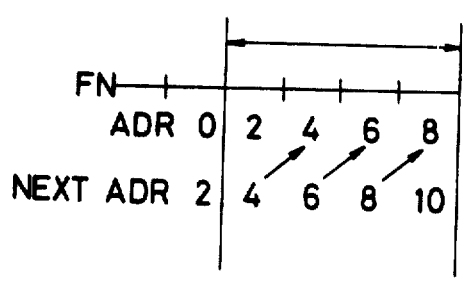
Figure 10D:
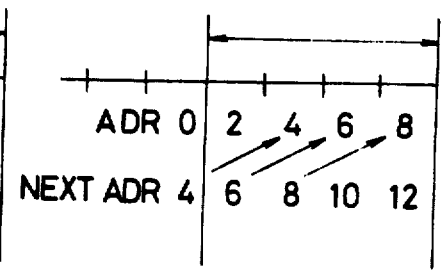

FIGS. 10A and 10B both show an example in which four continuous operations (control information) are achieved. These four operations (control information) are indicated by FN2, FN4, FN6 and FN8, which are functions of the micro instructions corresponding to data transfer between registers, addition, etc., respectively.

In FIG. 10A, five micro instructions are stored in the addresses 0, 2, 4, 6 and 8 of the control memory CM and the address of each micro instruction to be executed next is indicated by the bit pattern of each micro instruction immediately preceding it and the micro instructions are executed one after another. To perform this, the control memory is required to be high-speed.

In FIG. 10B, five micro instructions are stored in the addresses 0, 2, 4, 6 and 8 of the control memory as is the case with FIG. 10A but, in this example, two banks BK0 and BK1 are employed, in each of which are stored micro instructions, each designating the address after the next one. Namely, as is apparent from FIG. 10B, the micro instruction at the address 0 in the bank BK0 designates the address 4 of the bank BK0 which is the address after the next, and the micro instruction at the address 2 of the bank BK1 designates the address 6 of the bank BK1 which is the address after the next. As is evident from this, in the microprogramming control system of this invention, even if a memory control of low-speed operation is employed, the operations of the banks BK0 and BK1 can be executed in a manner to overlap in time since the subsequent micro instructions are each read out from the other bank. As a result of this, the processing time is half the cycle time of each bank. Namely, even if the cycle time of each bank in FIG. 10B is twice as long as that in FIG. 10A, the read cycle times of both systems are equal to each other.

Figure 11A:
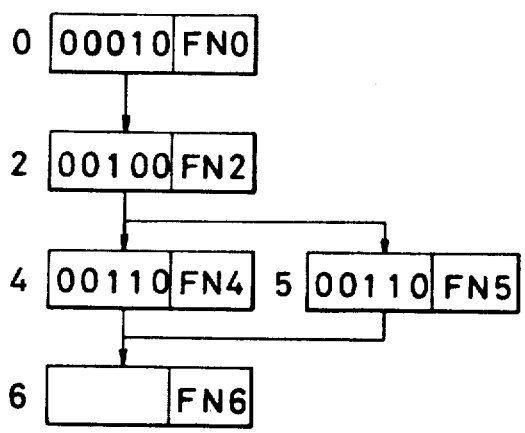
FIGS. 11A and 11B are diagrams for explaining the branch operation in the example of FIG. 4.
Figure 11B:
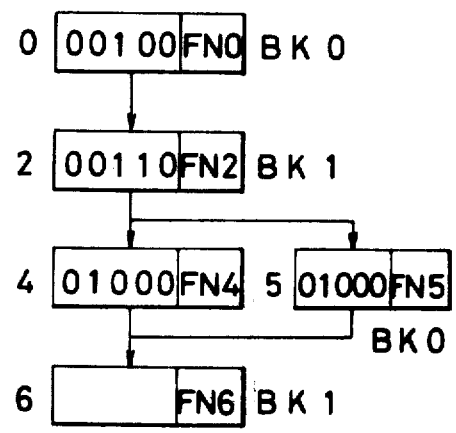

Referring now to FIGS. 11A and 11B, the processing operation in the case of branch existing, will be described.

The illustrated example shows the case where the operation is branched to the address 4 or 5 based on the result of controlling by the control information FN2 of the micro instruction read out from the address 2. In the conventional system of FIG. 11A, where the representation bit becomes 1 in accordance with the branch condition of the micro instruction of the control information FN2, the micro instruction from the address 5 (in which the micro instruction of the output of the part ODD) is stored in the data register. On the other hand, in the system of this invention shown in FIG. 11B, the operation advances to the address 4 or 5 according to the branch condition of the micro instruction of the control information FN2. The micro instruction of the address 4 (the part EVEN) or 5 ( the part ODD) starts to be read out one cycle before, but immediately before it is applied to the data register, only the micro instruction of the address 5 is selected and stored in the data register by the representation of the micro instruction selection designating circuit ID based on the result of control of the micro instruction, that is, because a representation bit 1 is sent out in the case where branch exists.

The processing operation is achieved as described above, so that, in the microprogramming control system of this invention, the same processing speed as that in the prior art can be obtained with an inexpensive memory regardless of the presence or absence of branch.

Figure 12:
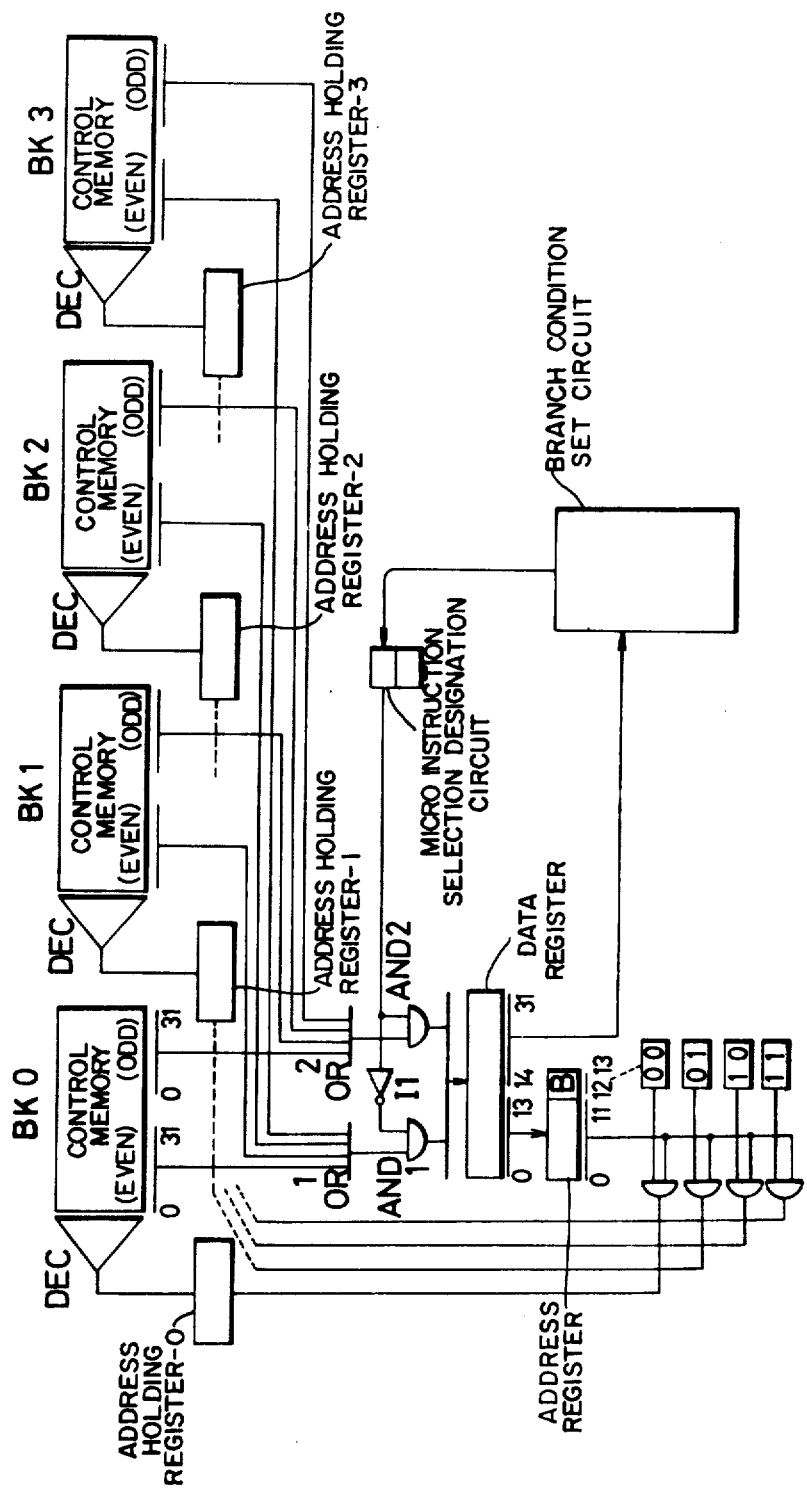
FIG. 12 is a block diagram illustrating another example of this invention employing four banks of control memory.
Figure 13:
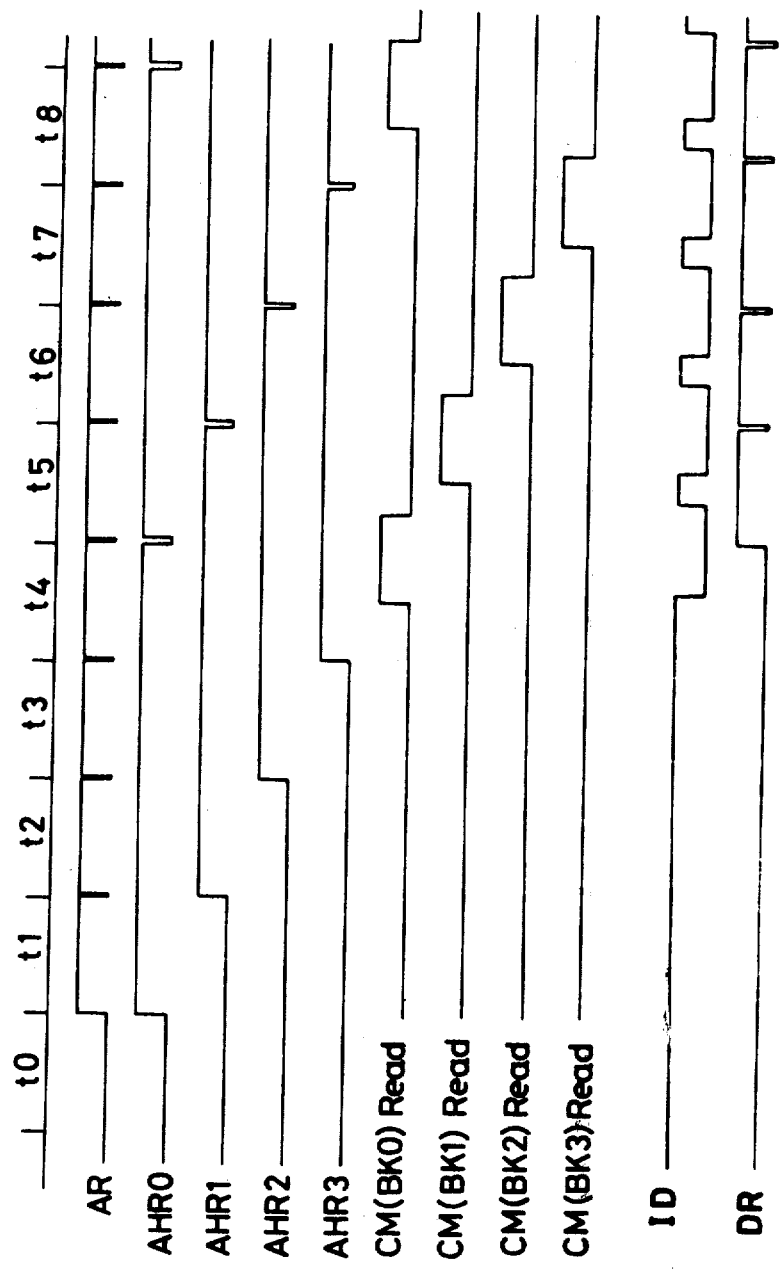
FIG. 13 is a time chart for the micro instruction readout in the example of FIG. 12.

FIG. 12 is a block diagram showing another example of this invention employing four banks; and FIG. 13 is a time chart for micro instruction readout operation.

The foregoing description has been given with regard to the case where two banks of the control memory CM are provided. However, in the case of employing a memory of longer cycle time, idle time can be eliminated by increasing the number of banks to three, four, . . . and high-speed processing can be performed.

FIG. 12 shows the case of employing four banks BK0 to BK3. Addresses 0, 8, 16, 24, . . . 8n and 1, 9, 17, 25, . . . 8n+1 are assigned to the parts EVEN and ODD of the bank BK0 respectively; addresses 2, 10, 18, 26, . . . 8n+2 and 3, 11, 19, 27, . . . 8n+3 are assigned to the parts EVEN and ODD of the bank BK1 respectively; similarly, addresses 8n+4 and 8n+5 are assigned to the parts EVEN and ODD of the bank BK2, respectively, and addresses 8n+6 and 8n+7 are assigned to the parts EVEN and ODD of the bank BK3, respectively. In the areas corresponding to the addresses of the part EVEN are recorded micro instructions obtainable without regard to the operation such as branch or the like, and in the areas corresponding to the addresses of the part ODD are recorded micro instructions based on branch.

At first, when a leading address of a micro program corresponding to a micro instruction is applied to the address register AR, the bank to be read out is designated in accordance with a predetermined bank designating area B in the leading address at substantially the same time as the application of the leading address (in the cycle $t_1$). In the present example, of the bits 0 to 13 of the address register AR, two lowest bits are used as the bank designating area B and, according to the bit pattern 00, 01, 10 or 11 of the area B, the address (the bit 0 to 11) is applied to one of address holding registers AHR0 to AHR3. Namely, addresses are sequentially set in the register AHR0 in the cycle $t_1$, in the register AHR1 in the cycle $t_2$ in the register AHR2 in the cycle $t_3$ and, in the register AHR3 in the cycle $t_4$. The addresses set in registers AHR0 to AHR3, are held for four cycles. In the above manner, the addresses are set in the address holding registers AHR0 to AHR3 in parallel while being displaced one cycle apart in time. The data is correspondingly read out from the banks BK0 to BK3 while being displaced one cycle apart in time (CM(BK) Read in FIG. 13).

The micro instruction of the part ODD or EVEN read out from each bank is selected and applied depending upon whether the flip-flop of the micro instruction selection designating circuit ID is put in its set or reset state by the signal from the branch condition establishing circuit BC. FIG. 13 shows the case in which the flip-flops are all in their set state.

In this manner, one micro instruction is set in the data register DR from each bank for each cycle, so that the four banks use the data register DR in a time-sharing manner.

Thereafter, the next address part of each micro instruction stored in the data register DR is transferred to the address register AR. In this case, the next address part designates the address after four steps. For example, the micro instruction at the address 2 of the bank BK1 designates the address 10 of the bank BK1 which is the address after four steps.

Accordingly, even if memories of slow cycle time are employed as the control memories, the operations of the four banks can be performed overlappingly, so that processing can be effected within one-fourth of the cycle time of each bank.

As has been described in the foregoing, according to this invention, readout can be achieved at the same speed as that for the conventional micro instruction readout by the use of inexpensive control memories of poor performance, so that this invention is of great utility in practical use.

It will be apparent that many modifications and variations may be effected without departing from the scope of the novel concepts of this invention.

Therefore, it is intended by the appended claims to cover all such modifications and variations which fall within the true spirit and scope of the invention.

I claim as my invention:

1. A microprogramming control system comprising:
    a plurality of control memory means for storing micro instructions, said plurality of control memory means being sequentially addressed with address designations and each addressed control memory means reading out, in turn, a set of plural micro instructions in response to each respective address designation supplied thereto;
    means for sequentially addressing said plurality of control memory means with said address designations;
    selection gate means connected to said plurality of control memory means operating in time-shared fashion for selecting one of said plural micro instructions in said set as read out from a given one of said sequentially addressed control memory means; and
    data register means, connected to said selection gate means and said addressing means, for storing said selected micro instruction, wherein said selected micro instruction contains a bank designating portion for identifying said given one of said plurality of control memory means and a next address designation portion for obtaining the next set of plural micro instructions from said given one of said sequentially addressed control memory means.

2. A microprogramming control system according to claim 1, wherein said addressing means includes an address register means for receiving said nest address designation portion from said data register means and transferring said next address designation portion to said given control memory means;
    said address register means includes a designating means responsive to said bank designating portion of said selected micro instruction for controlling said transfer of said next address designation portion to said given control memory means.

3. A microprogramming control system according to claim 2, wherein said addressing means includes register means connected to said given control memory means, for holding said next address designation portion, and said address holding register means temporarily holds said next address designation portion until said given control memory means is next addressed in said sequence to read out its next set of plural micro instructions.

4. A microprogramming control system according to claim 3, including a branch condition means which receives a portion of each said selected micro instruction stored in said data register means and correspondingly produces a control signal for controlling said selection gate means, to thereby determine which one of the next of said set of plural micro instructions read out from a corresponding one of said sequentially addressed control memory means is correspondingly selected and gated through said selection gate means, said control signal is determined in said branch condition means as a result of a branch operation on a portion of the micro instruction stored in said data register means.

5. A microprogramming control system according to claim 1, including a branch condition means which receives a portion of each said selected micro instruction stored in said data register means and correspondingly produces a control signal for controlling said selection gate means, to thereby determine which one of the next of said set of plural micro instructions read out from a corresponding one of said sequentially addressed control memory means is correspondingly selected and gated through said selection gate means, said control signal is determined in said branch condition means as a result of a branch operation on a portion of the micro instruction stored in said data register means.

* * * * *

UNITED STATES PATENT OFFICE
CERTIFICATE OF CORRECTION

Patent No. 4,008,462  Dated February 15, 1977

Inventor(s) Yasunori Kanda  Page 1 of 2

It is certified that error appears in the above-identified patent and that said Letters Patent are hereby corrected as shown below:

```
Column 5, line 39,  before "effective" insert --overall--.
Column 6, line 43,  "0" should be --"0"--.
Column 6, line 46,  "1" should be --"1"--.
Column 6, line 55,  "0000" should be --"0000"--.
Column 6, line 55,  "0" should be --"0"--.
Column 6, line 56,  "0001" should be --"0001"--.
Column 6, line 56,  "1" should be --"1"--.
Column 6, line 57,  "0010" should be --"0010"--.
Column 6, line 58,  "0" should be --"0"--.
Column 6, line 59,  "0011" should be --"0011"--.
Column 6, line 59,  "1" should be --"1"--.
Column 6, line 61,  "0100" should be --"0100"--.
Column 6, line 61,  "1" should be --"1"--.
Column 7, line 23,  "0000" should be --"0000"--.
Column 7, line 23,  "0" should be --"0"--.
Column 7, line 26,  "0001" should be --"0001"--.
Column 7, line 26,  "1" should be --"1"--.
Column 7, line 27,  "0010" should be --"0010"--.
Column 7, line 27,  "0011" should be --"0011"--.
Column 7, line 27,  "0100" should be --"0100"--.
Column 7, line 33,  "1" should be --"1"--.
Column 7, line 36,  "1" should be --"1"--.
```

UNITED STATES PATENT OFFICE
CERTIFICATE OF CORRECTION

Patent No. 4,008,462  Dated February 15, 1977

Inventor(s) Yasunori Kanda  Page 2 of 2

It is certified that error appears in the above-identified patent and that said Letters Patent are hereby corrected as shown below:

Column 7, line 41, "0100" should be --"0100"--.
Column 7, line 60, "ANd" should be --AND--.
Column 8, line 55, "l" should be --"1"--.
Column 9, line 3, "l" should be --"1"--.
Column 10, line 54, change "nest" to --next--.

Signed and Sealed this

Tenth Day of May 1977

[SEAL]

Attest:

RUTH C. MASON  
Attesting Officer

C. MARSHALL DANN  
Commissioner of Patents and Trademarks